(12) United States Patent
Shimizu

(10) Patent No.: US 8,725,444 B2
(45) Date of Patent: May 13, 2014

(54) THERMOMETER AND TEMPERATURE MEASUREMENT METHOD

(75) Inventor: Sakiko Shimizu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 675 days.

(21) Appl. No.: 13/038,571

(22) Filed: Mar. 2, 2011

(65) Prior Publication Data

US 2011/0224936 A1    Sep. 15, 2011

(30) Foreign Application Priority Data

Mar. 10, 2010   (JP) ................................ 2010-052827

(51) Int. Cl.
    *G01K 15/00*    (2006.01)
    *G01K 19/00*    (2006.01)
(52) U.S. Cl.
    USPC ............. 702/99; 600/549; 374/101; 374/110; 702/130; 702/131; 702/133
(58) Field of Classification Search
    CPC ...................................................... G01K 15/00
    USPC ........... 702/99, 130, 131, 132, 133, 134, 135, 702/136; 374/1, 101, 110, 112, 166, 183, 374/185; 600/549
    See application file for complete search history.

(56) References Cited

U.S. PATENT DOCUMENTS

| 6,086,247 | A  | * | 7/2000  | von Hollen .................... 374/137 |
| 7,249,883 | B2 | * | 7/2007  | Kuroda et al. ................. 374/110 |
| 7,828,743 | B2 | * | 11/2010 | Fraden .......................... 600/549 |
| 2006/0056487 | A1 | * | 3/2006  | Kuroda et al. ................. 374/179 |
| 2007/0055171 | A1 | * | 3/2007  | Fraden .......................... 600/549 |
| 2007/0295713 | A1 | * | 12/2007 | Carlton-Foss ................. 219/497 |
| 2008/0214951 | A1 | * | 9/2008  | Fritz et al. ..................... 600/549 |

FOREIGN PATENT DOCUMENTS

JP    2006-308538 A    11/2006

* cited by examiner

*Primary Examiner* — John Breene
*Assistant Examiner* — Yaritza H Perez Bermudez
(74) *Attorney, Agent, or Firm* — Global IP Counselors, LLP

(57) ABSTRACT

A thermometer includes a first surface temperature measurement unit; a first reference temperature measurement unit; a second surface temperature measurement unit; a second reference temperature measurement unit; a temperature correction unit that calculates a mounting positional difference between the first and second surface temperature measurement units from a measurement subject and a mounting positional difference between the first and second reference temperature measurement units from the measurement subject in terms of temperature differences that compensate for temperature dependence, thus correcting the first surface temperature and first reference temperature, or the second surface temperature and second reference temperature; and a core temperature calculation unit that calculates a core temperature of the measurement subject using the first surface temperature and first reference temperature or the second surface temperature and second reference temperature corrected by the temperature correction unit.

8 Claims, 12 Drawing Sheets

AMBIENT TEMPERATURE 25 °C
HEAT TRANSFER COEFFICIENT 0.01 W/m·k

OFFSET MEASUREMENT

FINISHED PRODUCT

WHEN ACTUAL MEASUREMENT TEMPERATURE OF HEAT SOURCE IS 37 °C.

| IDEAL | | TEMPERATURE MEASURING UNIT 14A | | TEMPERATURE MEASURING UNIT 14B | |
|---|---|---|---|---|---|
| OUTSIDE AIR SIDE | | T2 | 32.81205 | T4 | 33.54977 |
| HEAT SOURCE SIDE | | T1 | 34.06562 | T3 | 34.54898 |
| HEAT SOURCE TEMPERATURE | CALCULATION | 36.4479 | -0.5521 | | |
| | ACTUAL MEASUREMENT | 37 | | | |

| MOUNTING OFFSET | | TEMPERATURE MEASURING UNIT 14A | | TEMPERATURE MEASURING UNIT 14B | |
|---|---|---|---|---|---|
| OUTSIDE AIR SIDE | | T2 | 32.81205 | T4 | 33.62944 |
| HEAT SOURCE SIDE | | T1 | 34.06562 | T3 | 34.495 |
| HEAT SOURCE TEMPERATURE | CALCULATION | 35.45285 | -1.54715 | | |
| | ACTUAL MEASUREMENT | 37 | | | |

| ACTUAL MEASUREMENT-BASED CORRECTION | | TEMPERATURE MEASURING UNIT 14A | | TEMPERATURE MEASURING UNIT 14B | |
|---|---|---|---|---|---|
| OUTSIDE AIR SIDE | | T2 | 32.81205 | T4' | 33.54962 |
| HEAT SOURCE SIDE | | T1 | 34.06562 | T3' | 34.54866 |
| HEAT SOURCE TEMPERATURE | CALCULATION | 36.44466 | -0.55534 | | |
| | ACTUAL MEASUREMENT | 37 | | | |

| CALCULATION-BASED CORRECTION | | TEMPERATURE MEASURING UNIT 14A | | TEMPERATURE MEASURING UNIT 14B | |
|---|---|---|---|---|---|
| OUTSIDE AIR SIDE | | T2x | 32.81205 | T4x' | 33.54971 |
| HEAT SOURCE SIDE | | T1x | 34.06562 | T3x' | 34.54885 |
| HEAT SOURCE TEMPERATURE | CALCULATION | 36.44649 | -0.55351 | | |
| | ACTUAL MEASUREMENT | 37 | | | |

CORRECTION VALUES WERE CALCULATED FROM 40°C OFFSET RESULTS.

CORRECTED APPROXIMATELY TO THE "IDEAL" STATE.

FIG. 10

WHEN ACTUAL MEASUREMENT TEMPERATURE OF HEAT SOURCE IS 43 °C.

| IDEAL | TEMPERATURE MEASURING UNIT 14A | | TEMPERATURE MEASURING UNIT 14B | |
|---|---|---|---|---|
| OUTSIDE AIR SIDE | T2 | 36.71365 | T4 | 37.82457 |
| HEAT SOURCE SIDE | T1 | 38.59522 | T3 | 39.3235 |
| HEAT SOURCE TEMPERATURE | CALCULATION | 42.17645 | -0.8236 | |
| | ACTUAL MEASUREMENT | 43 | | |

| MOUNTING OFFSET | TEMPERATURE MEASURING UNIT 14A | | TEMPERATURE MEASURING UNIT 14B | |
|---|---|---|---|---|
| OUTSIDE AIR SIDE | T2 | 36.71365 | T4 | 37.91761 |
| HEAT SOURCE SIDE | T1 | 38.59522 | T3 | 39.22066 |
| HEAT SOURCE TEMPERATURE | CALCULATION | 40.62939 | -2.3706 | |
| | ACTUAL MEASUREMENT | 43 | | |

| ACTUAL MEASUREMENT-BASED CORRECTION | TEMPERATURE MEASURING UNIT 14A | | TEMPERATURE MEASURING UNIT 14B | |
|---|---|---|---|---|
| OUTSIDE AIR SIDE | T2 | 36.71365 | T4 | 37.82441 |
| HEAT SOURCE SIDE | T1 | 38.59522 | T3 | 39.32302 |
| HEAT SOURCE TEMPERATURE | CALCULATION | 42.17111 | -0.8289 | |
| | ACTUAL MEASUREMENT | 43 | | |

| CALCULATION-BASED CORRECTION | TEMPERATURE MEASURING UNIT 14A | | TEMPERATURE MEASURING UNIT 14B | |
|---|---|---|---|---|
| OUTSIDE AIR SIDE | T2x | 36.71365 | T4x' | 37.82451 |
| HEAT SOURCE SIDE | T1x | 38.59522 | T3x' | 39.3233 |
| HEAT SOURCE TEMPERATURE | CALCULATION | 42.17421 | -0.8258 | |
| | ACTUAL MEASUREMENT | 43 | | |

CORRECTED APPROXIMATELY TO THE "IDEAL" STATE.
CORRECTION VALUES WERE CALCULATED FROM 40 °C OFFSET RESULTS.

| USING 37 °C CORRECTION VALUES | TEMPERATURE MEASURING UNIT 14A | | TEMPERATURE MEASURING UNIT 14B | |
|---|---|---|---|---|
| OUTSIDE AIR SIDE | T2 | 36.71365 | T4' | 37.85545 |
| HEAT SOURCE SIDE | T1 | 38.59522 | T3' | 39.28889 |
| HEAT SOURCE TEMPERATURE | CALCULATION | 41.50777 | -1.4922 | |
| | ACTUAL MEASUREMENT | 43 | | |

ERRORS ARE SMALL BUT TEMPERATURES ARE NOT CORRECTED APPROXIMATELY TO THE "IDEAL" STATE.

FIG. 11

THERMOMETER AND TEMPERATURE MEASUREMENT METHOD

BACKGROUND

1. Technical Field

The present invention relates to a thermometer and a temperature measurement method.

2. Related Art

In the related art, a number of biological information measurement devices for managing health are used at home. For example, users measure their blood pressure to regulate their salt intake or measure their blood sugar level to administer insulin. In this way, daily biological information is measured at a determined time to collect the trend of biological information. There is an increasing demand for collecting the trend of biological information. A body temperature which is fundamental vital information provides biological information such as health condition, basal metabolic condition, or mental condition. A thermometer is a measurement device frequently used in daily life due to its simplicity of measurement. However, since the thermometer involves a short period of a non-active state (resting state) as necessary, there is few measurement device (product) which is frequently used and which is capable of measuring temperatures constantly even during activities. The invention relates to a core body thermometer which is capable of collecting a daily trend and which improves accuracy by correcting sensor mounting accuracy through calculation.

When it is necessary to know the internal temperature of a furnace or a pipeline, it may be desirable to measure the internal temperature indirectly from the outside without cutting the facility to install a thermometer and without a possibility of deterioration due to corrosion of the thermometer by the internal substance. Moreover, when it is necessary to know the health condition, basal metabolic condition, or mental condition from the body temperature of animals, temperature information of the core portion rather than the temperature of a surface layer portion is needed. In such a case, it is desirable to know the internal temperature via the surface layer portion. A biometric device is known as a heat flux compensation-type core body thermometer. However, this type of thermometer uses a heater in order to achieve temperature equilibrium between a temperature sensing probe and the core portion and thus consumes a large amount of power. Moreover, such a thermometer is too bulky and lacks portability. In the related art, there is a thermometer which is a non-heating type core body thermometer and which is capable of obtaining a core body temperature from unknown thermal resistance values of a temperature detection unit and the skin (for example, see JP-A-2006-308538). This thermometer uses a technique in which heat insulating materials on the surface attached to a measurement surface have the same thermal resistance, and a heat flux difference is given to the opposite side of the measurement surface, thus calculating the internal temperature. According to this technique, it is possible to measure the internal temperature based on only temperature information even when the thermal resistance values of the associated materials are unknown.

However, the thermometer disclosed in JP-A-2006-308538 has a possibility that satisfactory accuracy is not obtained due to mounting position offsets of the temperature detection unit.

SUMMARY

An advantage of some aspects of the invention is to solve at least a part of the problems described above and the invention can be implemented as the following forms or application examples.

APPLICATION EXAMPLE 1

This application example of the invention is directed to a thermometer including a first surface temperature measurement unit that measures a first surface temperature (T1X) of a measurement subject; a first reference temperature measurement unit that measures a temperature as a first reference temperature (T2X) at a posit ion where the temperature has a predetermined thermal resistance value between the position and the measurement position of the first surface temperature and has a first thermal resistance value between the position and the outside air; a second surface temperature measurement unit that measures a second surface temperature (T3X) at a surface position different from the measurement position of the first surface temperature; a second reference temperature measurement unit that measures a temperature as a second reference temperature (T4X) at a position where the temperature has the predetermined thermal resistance value between the position and the measurement position of the second surface temperature and has a second thermal resistance value different from the first thermal resistance value between the position and the outside air; a temperature correction unit that calculates a mounting positional difference between the first and second surface temperature measurement units from the measurement subject and a mounting positional difference between the first and second reference temperature measurement units from the measurement subject in terms of temperature differences that compensate for temperature dependence, thus correcting the first surface temperature and first reference temperature, or the second surface temperature and second reference temperature; and a core temperature calculation unit that calculates a core temperature of the measurement subject using the first surface temperature and first reference temperature or the second surface temperature and second reference temperature corrected by the temperature correction unit.

With this configuration, in a thermometer that measures the internal temperature via a substance, it is possible to calculate and correct the mounting position offsets of sensors and measure the core temperature with satisfactory accuracy. Moreover, it is possible to measure a wide range of temperatures to increase the accuracy by taking the temperature compensation into consideration in the calculation-based correction. Furthermore, since all temperatures can be corrected through calculation, there is no limit to the range of provided temperatures due to a mounting offset. In addition, it is not necessary to change the mounting settings of temperature sensors in accordance with the specified range. In this way, since the mounting position offsets of the sensors are corrected through calculation, the measurement accuracy of the internal temperature increases. Moreover, it is possible to decrease fault rates due to mounting offset of sensors and to improve yield.

APPLICATION EXAMPLE 2

This application example of the invention is directed to the thermometer, wherein the temperature correction unit performs temperature compensation by an amount ($\Delta TaX$, $\Delta TbX$) given by the following equation (1) or (2) from a temperature difference ($\Delta TaA$) between the temperature (T1A) of the first surface temperature measurement unit and the temperature (T3A) of the second surface temperature measurement unit in an offset state where the first and second thermal resistance values are the same and from a temperature difference (ΔTbA) between the temperature (T2A) of the first reference temperature measurement unit and the temperature (T4A) of the second reference temperature measurement unit, thus adding or subtracting the first surface temperature and the first reference temperature or the second surface temperature and the second reference temperature on the same side as a side where the first or second thermal resistance value is the same as the thermal resistance value in the offset state.

[Formula 1]

$$\Delta Ta_X = \frac{T1_X - T2_X}{T1_A - T2_A} \Delta Ta_A \Biggr\}$$
$$\Delta Tb_X = \frac{T1_X - T2_X}{T1_A - T2_A} \Delta Tb_A \Biggr\}$$
(1)

$$\Delta Ta_X = \frac{T3_X - T4_X}{T3_A - T4_A} \Delta Ta_A \Biggr\}$$
$$\Delta Tb_X = \frac{T3_X - T4_X}{T3_A - T4_A} \Delta Tb_A \Biggr\}$$
(2)

With this configuration, the mounting position offsets of sensors are easily corrected through calculation. Moreover, in a specification where high accuracy is needed over a wide temperature range, the number of offset measurement steps can be decreased. Furthermore, when it is necessary to perform an offset measurement in order to obtain a temperature compensation curve in a specified temperature range, it is possible to perform temperature compensation using the correction values obtained through an offset measurement at a certain temperature at one location. That is, by performing an offset measurement at a certain temperature at one location through temperature compensation of the temperature differences ΔTa and ΔTb resulting from mounting offsets, it is possible to correct temperatures over a wide range.

APPLICATION EXAMPLE 3

This application example of the invention is directed to the thermometer, wherein a common heat insulating portion having the predetermined thermal resistance value is provided between the measurement position of the first surface temperature and the measurement position of the first reference temperature and between the measurement position of the second surface temperature and the measurement position of the second reference temperature. It is also preferable that a first heat radiation control portion having the first thermal resistance value is provided between the measurement position of the first reference temperature and the outside air, and a second heat radiation control portion having the second thermal resistance value is provided between the measurement position of the second reference temperature and the outside air.

With this configuration, the first and second surface temperature measurement units are covered by the heat insulating portion having the same thermal resistance value. Here, the respective heat insulating portions are located between the measurement position of the surface temperature and the measurement position of the reference temperature. Moreover, the first and second heat radiation control portions having different thermal resistance values are provided between the measurement positions of the respective reference temperatures and the outside air. Therefore, the heat flux value between the first surface temperature measurement position and the second reference temperature measurement position is different from the heat flux value between the second surface temperature measurement position and the second reference temperature measurement position. That is, the first surface temperature, the first reference temperature, the second surface temperature, and the second reference temperature have different measurement values.

APPLICATION EXAMPLE 4

This application example of the invention is directed to the thermometer, wherein the thermometer further includes a display device having a display unit for displaying the core temperature calculated by the core temperature calculation unit; and a thermometer main body having the first and second surface temperature measurement units, and the display device and the thermometer main body are provided separately.

With this configuration, since the display device and the thermometer main body are provided separately, the weight of the thermometer main body having the first and second surface temperature measurement units which come into contact with the surface of the measurement subject can be reduced. Therefore, even when the thermometer main body remains in contact with the surface of the measurement subject for a long period, the thermometer main body will not apply much load to the subject. Thus, it is possible to monitor the temperature continuously for a long period.

APPLICATION EXAMPLE 5

This application example of the invention is directed to the thermometer, wherein the core temperature calculation unit is provided in the display device.

With this configuration, since the core temperature calculation unit is provided in the display device, the number of components mounted on the thermometer main body can be reduced to the minimum. Therefore, it is possible to further reduce the size and weight of the thermometer main body, and even when the thermometer main body remains in contact with the surface of the measurement subject to perform measurement for a long period, the load applied to the subject can be reduced further.

APPLICATION EXAMPLE 6

This application example of the invention is directed to the thermometer, wherein the display device and the thermometer main body have a transceiver device capable of transmitting and receiving information to/from each other through wireless communication.

With this configuration, since the display device and the thermometer main body have the transceiver device and are capable of performing radio communication with each other, the display device can be provided at a certain distance from the thermometer main body. Since the display device and the thermometer main body are not connected by wirings, the thermometer main body can be completely separated from the display device. Thus, the weight of the thermometer main body is further reduced, and the handleability of the thermometer main body is improved.

APPLICATION EXAMPLE 7

This application example of the invention is directed to the thermometer, wherein the thermometer is configured to be attachable to the surface of the measurement subject.

With this configuration, since the thermometer is configured to be attachable to the surface of the measurement subject, the operability and portability of the thermometer are improved. For example, when using the thermometer with infants or babies, it is difficult to maintain favorable contact between the thermometer and the body surface for a predetermined period. In such a case, since the thermometer is configured to be attachable to the body surface, even when an infant or a baby moves, it is possible to maintain a favorable contact state between the body surface and the thermometer and to measure accurate temperatures.

APPLICATION EXAMPLE 8

This application example of the invention is directed to a temperature measurement method for measuring a core temperature of a measurement subject, including: measuring a first surface temperature of the measurement subject, thus measuring a temperature as a first reference temperature at a position where the temperature has a predetermined thermal resistance value between the position and the measurement position of the first surface temperature and has a first thermal resistance value between the position and the outside air; measuring a second surface temperature at a surface position different from the measurement position of the first surface temperature, thus measuring a temperature as a second reference temperature at a position where the temperature has the predetermined thermal resistance value between the position and the measurement position of the second surface temperature and has a second thermal resistance value different from the first thermal resistance value between the position and the outside air; calculating a measurement positional difference between the first and second surface temperatures from the measurement subject and a measurement positional difference between the first and second reference temperatures from the measurement subject in terms of temperature differences that compensate for temperature dependence, thus correcting the first surface temperature and first reference temperature, or the second surface temperature and second reference temperature; and calculating the core temperature based on the corrected first surface temperature and first reference temperature or the corrected second surface temperature and second reference temperature.

In the temperature correction step, the first surface temperature, first reference temperature, second surface temperature, and second reference temperature obtained in the first and second temperature measurement steps are corrected. Moreover, in the core temperature calculation step, the core temperature of the measurement subject is calculated based on the measurement values corrected in the temperature correction step.

With this configuration, since the mounting position offsets of the sensors are corrected through calculation, the measurement accuracy of the internal temperature increases. Moreover, since it is possible to decrease fault rates due to mounting offset of sensors, it is possible to improve yield. Furthermore, it is possible to measure the internal temperature via a substance without being limited to a living body. The invention also provides a temperature measurement method capable of measuring the internal temperature with high accuracy via a substance.

BRIEF DESCRIPTION OF THE DRAWINGS

The invention will be described with reference to the accompanying drawings, wherein like numbers reference like elements.

FIG. 10 shows the results of actual measurement-based correction according to the first embodiment.

FIG. 11 shows the results of actual measurement-based correction according to a second embodiment.

DESCRIPTION OF EXEMPLARY EMBODIMENTS

Hereinafter, an electronic thermometer as a thermometer according to this embodiment and a measurement method thereof will be described with reference to the drawings.

Figure 1:
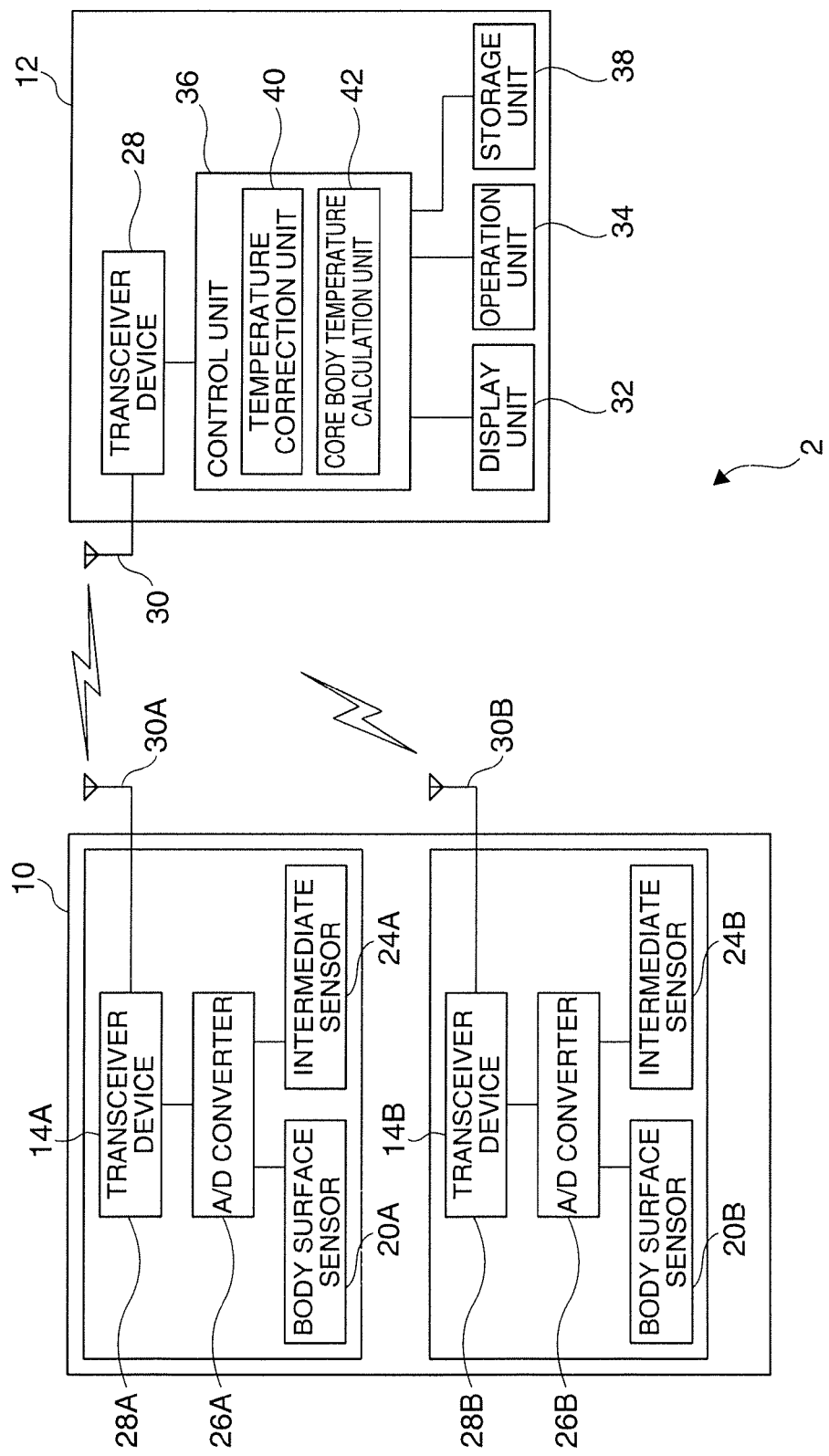
FIG. 1 is a block diagram showing a configuration of an electronic thermometer according to this embodiment.

FIG. 1 is a block diagram showing a configuration of an electronic thermometer according to this embodiment. The electronic thermometer 2 includes a thermometer main body 10 that comes into contact with a body surface 4A of a human body 4 (see FIG. 3) which is a measurement subject and a display device 12 that is provided separately from the thermometer main body 10.

Figure 2:
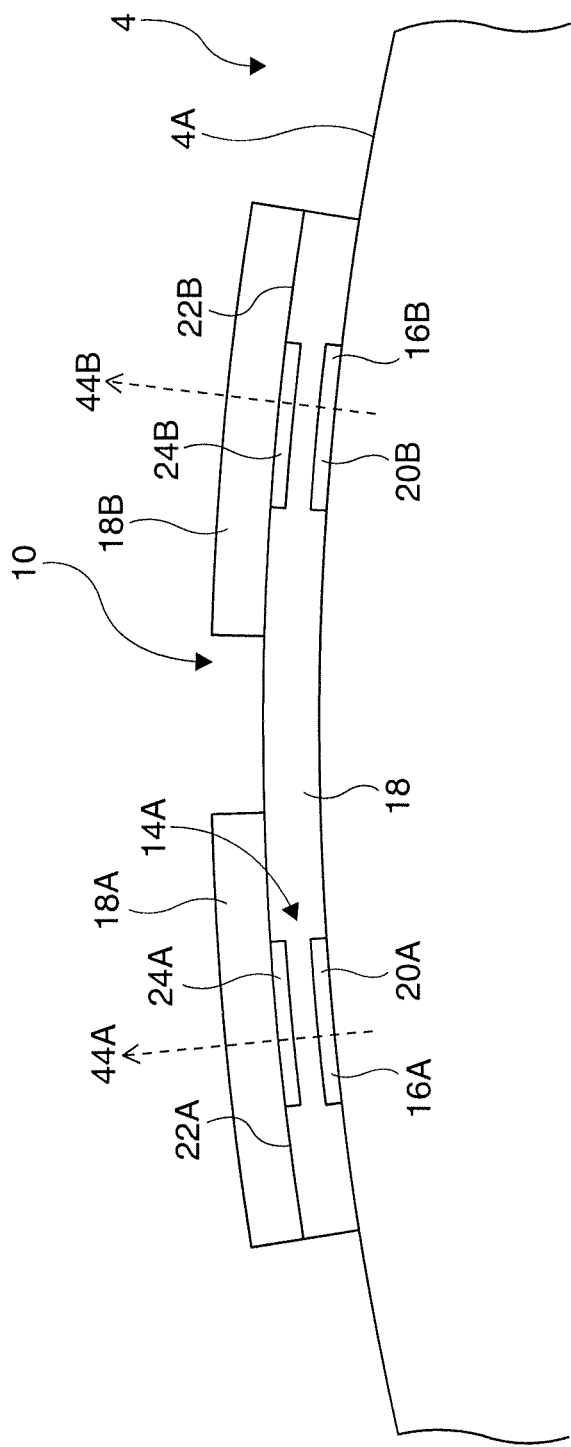
FIG. 2 is an enlarged view showing a state where the thermometer main body according to this embodiment is mounted on a human body.
Figure 3:
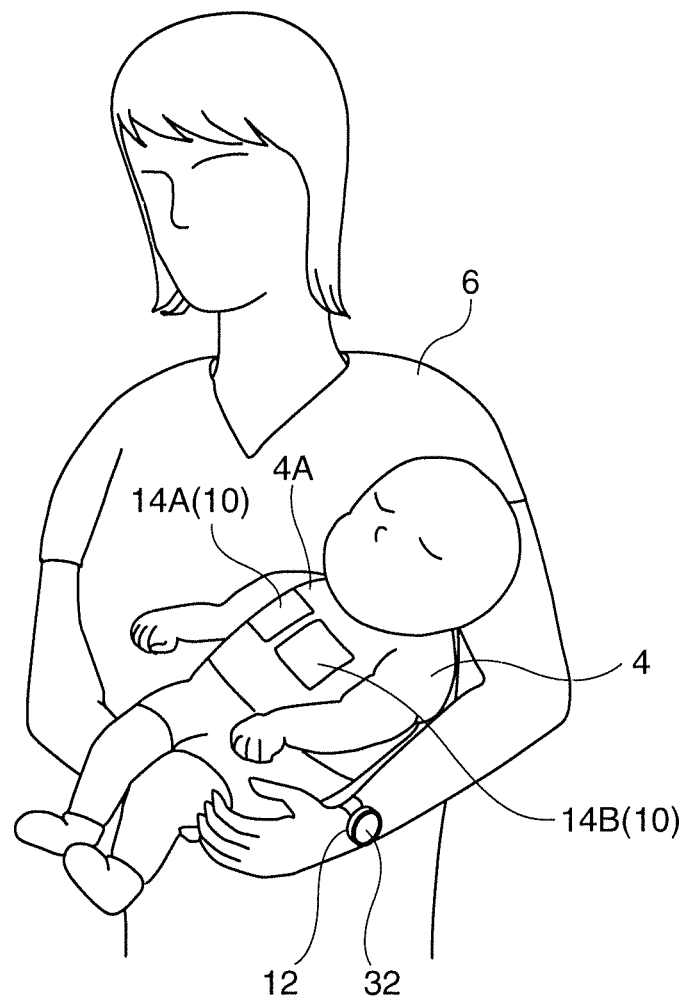
FIG. 3 shows a state where the thermometer main body according to this embodiment and a display device are mounted.

FIG. 2 is an enlarged view showing a state where the thermometer main body 10 according to this embodiment is mounted on the human body 4, and FIG. 3 shows a state where the thermometer main body 10 according to this embodiment and the display device 12 are mounted.

First, as shown in FIG. 2, the thermometer main body 10 includes two (a pair of) temperature measuring units 14A and 14B. The temperature measuring unit 14A includes a heat insulating portion 18 having a contact surface 16A that comes into contact with the body surface 4A of the human body 4 and a first heat radiation control portion 18A provided between the heat insulating portion 18 and the outside air. The temperature measuring unit 14B includes a heat insulating portion 18 having a contact surface 16B that comes into contact with the body surface 4A at a different position from the contact position of the temperature measuring unit 14A and a second heat radiation control portion 18B provided between the heat insulating portion 18 and the outside air. That is, the heat insulating portion 18 is provided in common to the temperature measuring units 14A and 14B and has the same thermal resistance value.

The temperature measuring unit 14A includes a first body surface sensor 20A as a first surface temperature measurement unit that measures the temperature of the body surface 4A as a first body surface temperature (first surface temperature) and a first intermediate sensor 24A as a first reference temperature measurement unit (intermediate temperature measurement device) that measures the temperature of the interface 22A between the heat insulating portion 18 and the first heat radiation control portion 18A as a first reference temperature.

The temperature measuring unit 14B includes a second body surface sensor 20B as a second surface temperature measurement unit that measures the temperature of the body surface 4A as a second body surface temperature (second surface temperature) and a second intermediate sensor 24B as a second reference temperature measurement unit (intermediate temperature measurement device) that measures the temperature of the interface 22B between the heat insulating portion 18 and the second heat radiation control portion 18B as a second reference temperature.

The thermometer main body 10 having these temperature measuring units 14A and 14B is configured so that the contact surfaces 16A and 16B are attachable to the human body 4 by an adhesive or the like, whereby the thermometer main body 10 is closely attached to the body surface 4A with a satisfactory contact pressure by the adhesive or the like.

Here, it is preferable that the adhering position of the thermometer main body 10 is the forehead, the back of the head, the chest, the back, or the like where the body surface temperature can be measured in a relatively stable manner. Clothing may be worn over the thermometer main body 10, and the thermometer main body 10 may be in contact with bedding.

The first heat radiation control portion 18A of the temperature measuring unit 14A is formed of a different material from the second heat radiation control portion 18B of the temperature measuring unit 14B. Thus, the thermal resistance value of the first heat radiation control portion 18A is different from the thermal resistance value of the second heat radiation control portion 18B. The first and second heat radiation control portions 18A and 18B are provided on portions that are in contact with the outside air so that the temperature distribution of a first system 44A is different from that of a second system 44B.

As for the body surface sensors 20A and 20B and intermediate sensors 24A and 24B, sensors that convert the temperature of the body surface 4A and the temperature values of the interfaces 22A and 22B into resistance values or convert the temperature values into voltage values can be used. As for sensors that convert temperature values into resistance values, a chip thermistor, a flexible printed board on which a thermistor pattern is printed, a platinum resistance temperature detector, and the like can be used. As for sensors that convert temperature values to voltage values, a thermoelectric transducer, a PN junction element, a diode, and the like can be used.

The temperature measuring units 14A and 14B include A/D converters 26A and 26B, respectively, as shown in FIG. 1, in addition to the body surface sensors 20A and 20B and the intermediate sensors 24A and 24B. Since the temperature measuring units 14A and 14B are formed integrally, the A/D converters 26A and 26B may be incorporated as a common A/D converter.

The A/D converters 26A and 26B convert analog signals of the resistance values or voltage values converted by the body surface sensors 20A and 20B and intermediate sensors 24A and 24B into digital signals and output the digital signals to transceiver devices 28A and 28B.

The transceiver devices 28A and 28B include antenna coils 30A and 30B, respectively and transmit the signals of the temperature values (resistance or voltage values) which are converted into the digital signals by the A/D converters 26A and 26B to the display device 12 over radio waves. The antenna coils 30A and 30B may be incorporated as a common antenna coil.

The display device 12 includes a display unit 32 that displays body temperature measurement results or the like, an operation unit 34 that enables a user to operate the display device 12 from the outside, a control unit 36 that controls the operation of the display device 12, and a storage unit 38 that stores information obtained from the control unit 36 or the like.

The display unit 32 displays temperature information and an operating window on a liquid crystal screen or the like. For example, measured body surface temperatures, core body temperatures as calculated core temperatures, and the like are displayed on the display unit 32. In this embodiment, the display unit 32 is provided on a portion corresponding to a regular dial plate of a wristwatch, and the display unit 32 is visible when an operator 6 has strapped the display device 12 to the wrist.

The operation unit 34 is configured so that a user is able to input information to the display device 12 from the outside using buttons, levers, keys, or the like. For example, the user is able to select a menu according to a window displayed on the display unit 32 and input information such as the name and age of a person to be measured (an infant in this embodiment), and the date and time of the body temperature measurement.

The control unit 36 includes a temperature correction unit 40 that corrects a first body surface temperature T1X from the first body surface sensor 20A and a first reference temperature T2X from the first intermediate sensor 24A or a second body surface temperature T3X from the second body surface sensor 20B and a second reference temperature T4X from the second intermediate sensor 24B. The control unit 36 also includes a core body temperature calculation unit 42 as a core temperature calculation unit that calculates a core body temperature Tcore of the human body 4 based on the first body surface temperature T1X' and first reference temperature T2X' or the second body surface temperature T3X' and second reference temperature T4X' corrected by the temperature correction unit 40.

The temperature correction unit 40 calculates a mounting positional difference between the first and second body surface sensors 20A and 20B from the measurement subject and a mounting positional difference between the first and second intermediate sensors 24A and 24B from the measurement subject in terms of temperature differences, thus correcting the first body surface temperature T1X and first reference temperature T2X or the second body surface temperature T3X and second reference temperature T4X.

The core body temperature calculation unit 42 calculates the core body temperature Tcore of the human body 4 using the first body surface temperature T1X' and first reference temperature T2X' or the second body surface temperature T3X' and second reference temperature T4X' corrected by the temperature correction unit 40.

The display device 12 may include a data output unit such as, for example, a wireless logging system and an I/F (for example, USB).

From the basic structure of the core body thermometer described above, a relational expression of an equation 3 is obtained.

[Formula 2]

$$Tcore = \frac{T3(T1-T2) - T1(T3-T4)}{(T3-T4) - (T1-T2)} \quad (3)$$

Figure 4A:
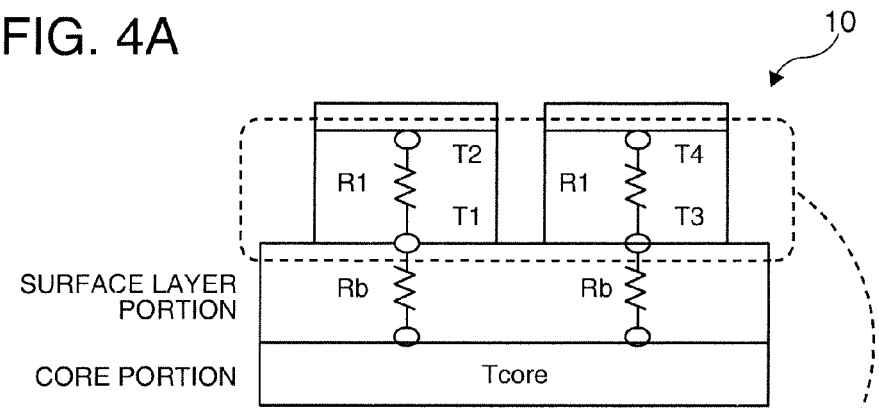
FIGS. 4A to 4C show the thermometer main body according to this embodiment.
Figure 4B:
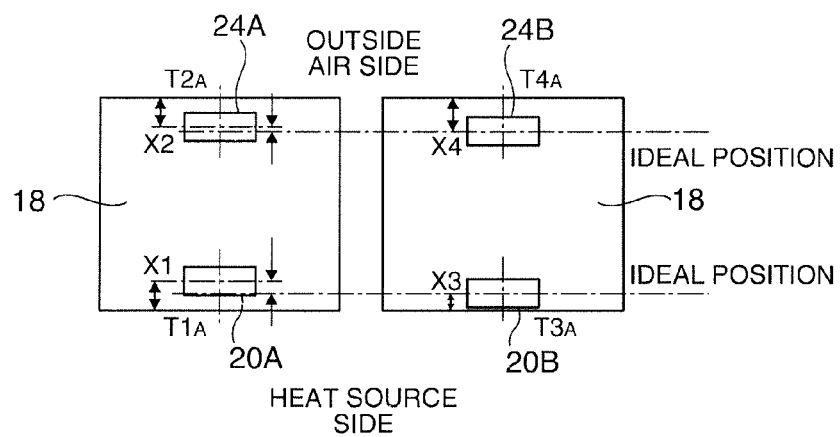
Figure 4C:
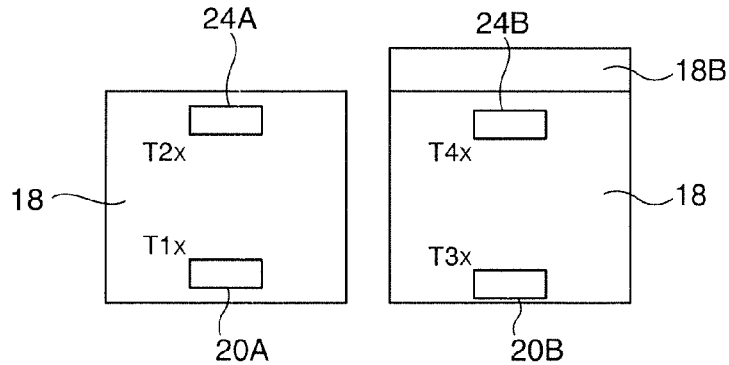

FIGS. 4A to 4C show the thermometer main body 10 according to this embodiment. FIG. 4A shows thermal resistances of the thermometer main body 10 and the human body 4, FIG. 4B shows an offset measurement state where no heat radiation control portion is provided in the thermometer main body 10, and FIG. 4C shows a finished product state where a heat radiation control portion is provided in the thermometer main body 10. As shown in the equation (3), the core body temperature Tcore does not depend on the thermal resistances of the temperature detection unit and the skin.

As shown in FIG. 4B, in an offset measurement state where the first and second heat radiation control portions 18A and 18B are formed of a material having the same thermal resistance, the mounting positions of the respective sensors are expressed as follows. The distance between the first body surface sensor 20A and a heat source-side end of the heat insulating portion 18 is X1, the distance between the second body surface sensor 20B and a heat source-side end of the heat insulating portion 18 is X3, the distance between the first intermediate sensor 24A and the outside air-side end of the heat insulating portion 18 is X2, and the distance between the second intermediate sensor 24B and the outside air-side end of the heat insulating portion 18 is X4. Moreover, the first and second body surface temperatures of the respective sensors are T1A and T3A, and the first and second reference temperatures are T2A and T4A. For example, as shown in FIG. 4B, the first and second heat radiation control portions 18A and 18B are removed so that the first and second heat radiation control portions 18A and 18B have the same thermal resistance.

In an ideal state (X1=X3 and X2=X4) where there is no mounting position offset, T1A=T3A and T2A=T4A. However, a temperature offset occurs due to a mounting position offset wherein the mounting positions are different, namely, X1≠X3 and X2≠X4, so that T1A≠T3A and T2A≠T4A. Therefore, in this embodiment, the temperature differences ΔTa and ΔTb due to the mounting position offset are calculated and corrected. That is, the temperature difference ΔTa which is the difference between T1A and T3A and the temperature difference ΔTb which is the difference between T2A and T4A are added or subtracted on a side having the same structure as that of the offset measurement state.

In a finished product state, the first and second body surface temperatures of the respective sensors are T1X and T3X, and the first and second reference temperatures are T2X and T4X. The finished product state is a state where the first or second heat radiation control portion 18A or 18B is formed of a material having a different thermal resistance from that of the offset measurement state. For example, as shown in FIG. 4C, the second heat radiation control portion 18B is formed of a material having a different thermal resistance from that of the outside air, so that the second heat radiation control portion 18B of the temperature measuring unit 14B is different from that of the offset measurement state.

It is assumed that the temperatures detected by the temperature sensors during the offset measurement state from the finished product state described above are T1A, T2A, T3A, and T4A. At that time, when the mounting position offsets are represented in terms of the temperature differences ΔTa and ΔTb, it is known that the temperature differences ΔTa and ΔTb have temperature dependence. Therefore, by deriving the temperature compensations ΔTaX and ΔTbX when the core temperature during the offset measurement state is A° C., the temperature differences are ΔTaA and ΔTbA, and an arbitrary core temperature is X° C., it is possible to calculate and correct the mounting position offset and measure the core temperature with satisfactory accuracy. Moreover, it is possible to measure a wide range of temperatures to increase the accuracy by taking the temperature compensation into consideration in the calculation-based correction. Furthermore, since all temperatures can be corrected through calculation, there is no limit to the range of provided temperatures due to amounting offset. In addition, it is not necessary to change the mounting settings of temperature sensors in accordance with the specified range.

[Formula 3]

$$\left.\begin{aligned} \Delta Ta_A &= T1_A - T3_A \\ \Delta Ta_X &= \frac{T1_X - T2_X}{T1_A - T2_A} \Delta Ta_A \\ T1'_X &= T1_X - \Delta Ta_X \end{aligned}\right\} \quad (4)$$

$$\left.\begin{aligned} \Delta Tb_A &= T2_A - T4_A \\ \Delta Tb_X &= \frac{T1_X - T2_X}{T1_A - T2_A} \Delta Tb_A \\ T2'_X &= T2_X - \Delta Tb_X \end{aligned}\right\} \quad (5)$$

Hereinafter, a method of calculating the core temperature by performing temperature compensation on the mounting position offset error will be described in detail. The equation 3 for calculating the core temperature may involve errors in the actual core body temperature and the calculated Tcore value if there is a mounting position offset in the temperature sensors that sense the temperatures T1, T2, T3, and T4. In order to correct the mounting position offset, the offset measurement state is achieved by making two sensor structures identical. It is assumed that the temperatures detected by the temperature sensors during the offset measurement state are T1A, T2A, T3A, and T4A. When the mounting position offsets are represented in terms of the temperature differences ΔTa and ΔTb, the temperature differences ΔTa and ΔTb have temperature dependence. Therefore, the temperature compensations ΔTaX and ΔTbX are derived when the core temperature during the offset measurement state is A° C., the temperature differences are ΔTaA and ΔTbA, and an arbitrary core temperature is X° C. With respect to the core temperatures A° C. and X° C., the relational expressions of the heat fluxes are obtained as equations (6) and (7) using the heat fluxes QA and QX and the resistance differences ΔRa and ΔRb corresponding to the position offsets.

[Formula 4]

$$\left.\begin{aligned} \Delta Ta_A &= Q_A \cdot \Delta Ra \\ \Delta Ta_X &= Q_X \cdot \Delta Ra \end{aligned}\right\} \quad (6)$$

$$\left.\begin{aligned} \Delta Tb_A &= Q_A \cdot \Delta Rb \\ \Delta Tb_X &= Q_X \cdot \Delta Rb \end{aligned}\right\} \quad (7)$$

When the temperatures T1A and T2A are offset (corrected), a relational expression of an equation (8) is obtained using a thermal resistance R between the sensors that sense the temperatures T1A and T2A.

[Formula 5]

$$Q_A = \frac{T1_A - T2_A}{R}$$
$$Q_X = \frac{T1_X - T2_X}{R}$$
(8)

From the equations (6), (7), and (8), a relational expression of an equation (9) is obtained.

[Formula 6]

$$\frac{Q_X}{Q_A} = \frac{\Delta Ta_X}{\Delta Ta_A} = \frac{\Delta Tb_X}{\Delta Tb_A} = \frac{T1_X - T2_X}{T1_A - T2_A}$$
(9)

Therefore, the temperature compensations ΔTaX and ΔTbX satisfy the relational expression of the equation (1).

[Formula 7]

$$\Delta Ta_X = \frac{T1_X - T2_X}{T1_A - T2_A} \Delta Ta_A$$
$$\Delta Tb_X = \frac{T1_X - T2_X}{T1_A - T2_A} \Delta Tb_A$$
(1)

When the compensated temperatures are T1X' and T2X', a relational expression of an equation (10) is obtained.

[Formula 8]

$$T1'_X = T1_X - \Delta Ta_X$$
$$T2'_X = T2_X - \Delta Tb_X$$
(10)

Therefore, the internal temperature corrected taking the temperature compensation into consideration in the mounting position offset errors satisfies a relational expression of an equation (11).

[Formula 9]

$$Tcore = \frac{T3_X(T1'_X - T2'_X) - T1'_X(T3_X - T4_X)}{(T3_X - T4_X) - (T1'_X - T2'_X)}$$
(11)

When the temperatures T3 and T4 are offset (corrected), a relational expression of an equation (12) is obtained using the thermal resistance R between the sensors that sense the temperatures T3 and T4.

[Formula 10]

$$Q_A = \frac{T3_A - T4_A}{R}$$
$$Q_X = \frac{T3_X - T4_X}{R}$$
(12)

From the equations (6), (7), and (12), a relational expression of the equation (13) is obtained.

[Formula 11]

$$\frac{Q_X}{Q_A} = \frac{\Delta Ta_X}{\Delta Ta_A} = \frac{\Delta Tb_X}{\Delta Tb_A} = \frac{T3_X - T4_X}{T3_A - T4_A}$$
(13)

Therefore, the temperature compensations ΔTaX and ΔTbX satisfy the relational expression of the equation (2).

[Formula 12]

$$\Delta Ta_X = \frac{T3_X - T4_X}{T3_A - T4_A} \Delta Ta_A$$
$$\Delta Tb_X = \frac{T3_X - T4_X}{T3_A - T4_A} \Delta Tb_A$$
(2)

When the compensated temperatures are T3X' and T4X', a relational expression of an equation (14) is obtained.

[Formula 13]

$$T3'_X = T3_X - \Delta Ta_X$$
$$T4'_X = T4_X - \Delta Tb_X$$
(14)

Therefore, the internal temperature corrected taking the temperature compensation into consideration in mounting position offset errors satisfies a relational expression of an equation (15).

[Formula 14]

$$Tcore = \frac{T3'_X(T1_X - T2_X) - T1_X(T3'_X - T4'_X)}{(T3'_X - T4'_X) - (T1_X - T2_X)}$$
(15)

Therefore, the core body temperature calculation unit 42 stores the equation (15) or (11) as a calculation formula of the core body temperature Tcore.

The storage unit 38 stores the first and second body surface temperatures T1X and T3X and the first and second reference temperatures T2X and T4X transmitted from the thermometer main body 10. Moreover, the storage unit 38 stores the first and second body surface temperatures T1X' and T3X' and the first and second reference temperatures T2X' and T4X' corrected by the temperature correction unit 40. Furthermore, the storage unit 38 stores the core body temperature Tcore of the human body 4 calculated by the core body temperature calculation unit 42.

Here, the storage unit 38 is configured to be able to store temperature information of a plurality of human bodies 4, and the core body temperature Tcore and the like are stored for each human body 4. Moreover, the storage unit 38 is able to store the measurement positions of the first and second body surface temperatures T1X and T3X and the like measured at the time of calculating the core body temperature Tcore. The storage unit 38 may store the measurement information such as, for example, the name and age of a person to be measured (the human body 4, namely an infant), the date and time of the measurement, and the like. In this case, the measurement information may be input from the operation unit 34.

The electronic thermometer 2 operates as follows.

Figure 5:
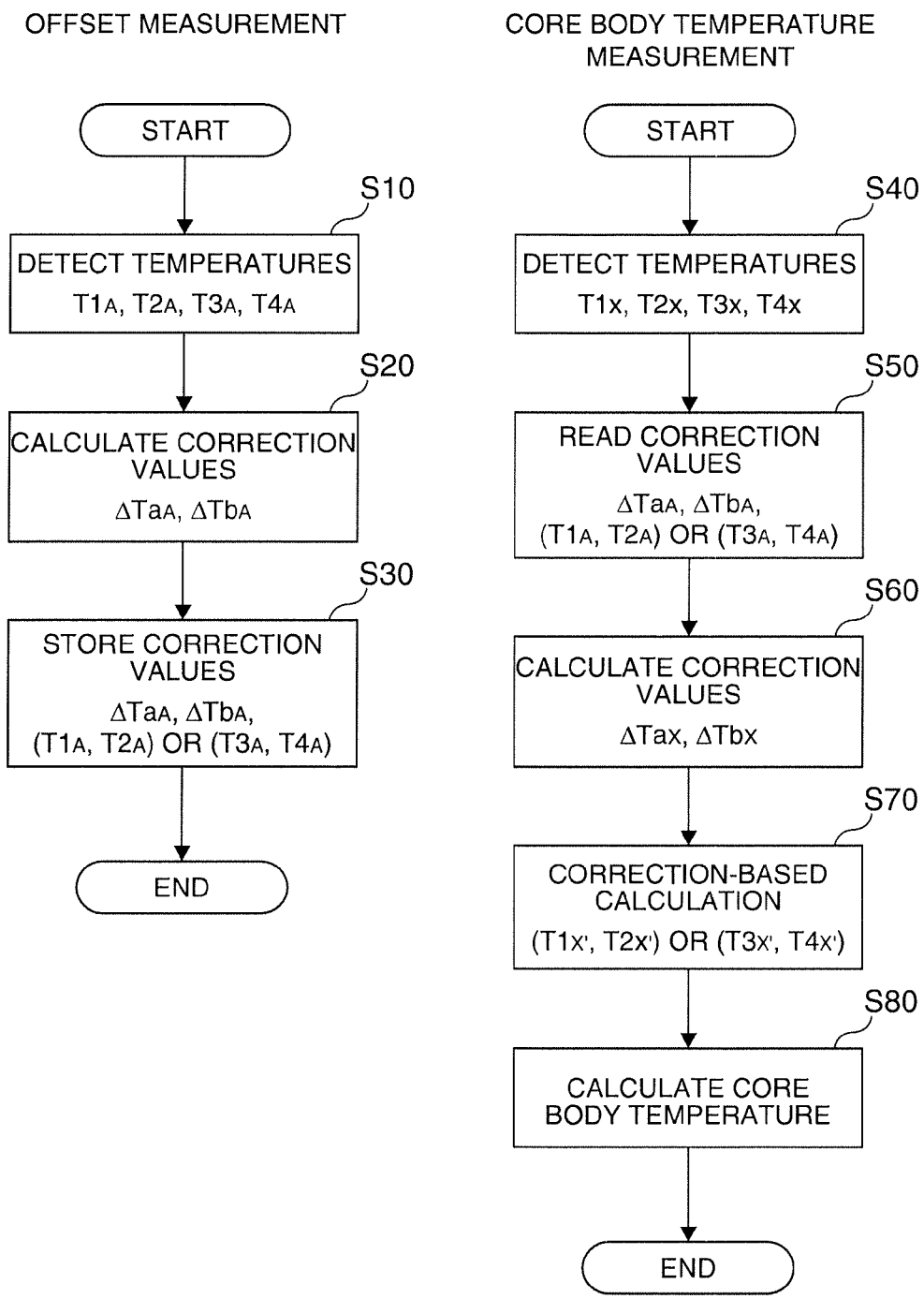
FIG. 5 is a flowchart showing an operation of the electronic thermometer according to this embodiment.

FIG. 5 is a flowchart showing an operation of the electronic thermometer 2 according to this embodiment.

Offset Measurement State

First, the thermometer main body 10 drives the body surface sensors 20A and 20B and the intermediate sensors 24A and 24B to measure the first and second body surface temperatures T1A and T3A of the body surface 4A and the first and second reference temperatures T2A and T4A of the interfaces 22A and 22B (step S10).

Subsequently, the thermometer main body 10 calculates a temperature difference ΔTa between the first and second body surface temperatures T1A and T3A and a temperature difference ΔTb between the first and second reference temperatures T2A and T4A (step S20).

Subsequently, the thermometer main body 10 stores the temperature differences ΔTa and ΔTb in the storage unit 38 (step S30). Core Temperature Measurement (Finished Product State)

First, the thermometer main body 10 is attached to the human body 4 (the chest of an infant in this embodiment), and the operator 6 of the electronic thermometer 2 who is holding the infant attaches the display device 12 to the arm. When the operator 6 operates the operation unit 34 of the display device 12 to turn ON the switch of the display device 12, the transceiver device 28 transmits radio waves to the thermometer main body 10 (the temperature measuring units 14A and 14B) through the antenna coil 30. The radio waves cause electromagnetic induction to generate an electromotive force in the antenna coils 30A and 30B, whereby the thermometer main body 10 is charged.

Subsequently, the electromotive force energizes the thermometer main body 10, thus energizing the body surface sensors 20A and 20B and the intermediate sensors 24A and 24B.

Subsequently, when the sensors 20A, 20B, 24A, and 24B are energized, the thermometer main body 10 transmits a standby signal to the display device 12 through the transceiver devices 28A and 28B.

Subsequently, upon receiving the standby signal, the control unit 36 of the display device 12 transmits a temperature measurement start signal from the transceiver device 28 through the antenna coil 30.

Subsequently, upon receiving the temperature measurement start signal, the thermometer main body 10 drives the body surface sensors 20A and 20B and the intermediate sensors 24A and 24B to measure the first and second body surface temperatures T1X and T3X of the body surface 4A and the first and second reference temperatures T2X and T4X of the interfaces 22A and 22B (step S40: first and second temperature measurement steps). The temperature information of the body surface temperatures T1X and T3X and the reference temperatures T2X and T4X is converted from analog signals to digital signals by the A/D converters 26A and 26B and the digital signals are transmitted to the display device 12 by the transceiver devices 28A and 28B. Here, it is preferable that the body surface temperatures T1X and T3X and the reference temperatures T2X and T4X are measured after the elapse of a predetermined period so that the transfer of heat from the core portion of the human body 4 to the body surface 4A reaches a steady (equilibrium) state.

Subsequently, the temperature correction unit 40 of the control unit 36 corrects the first body surface temperature T1X and first reference temperature T2X or the second body surface temperature T3X and second reference temperature T4X based on the temperature differences ΔTa and ΔTb read from the storage unit 38 (steps S50 and S60: temperature correction step).

Subsequently, the core body temperature calculation unit 42 of the control unit 36 calculates the core body temperature Tcore by substituting the first body surface temperature T1X' and first reference temperature T2X' corrected in step S60 into the equation (11) or the second body surface temperature T3X' and second reference temperature T4X' into the equation (15) (step S70: core body temperature calculation step).

Subsequently, the control unit 36 stores the core body temperature Tcore in the storage unit 38 and displays the core body temperature Tcore on the display unit 32. Thus, the operator 6 is able to check the core body temperature Tcore on the display unit 32 of the wristwatch-type display device 12 while holding an infant.

After that, the control unit 36 measures the time elapsed from the measurement of the body surface temperatures T1X and T3X using an internal timer and monitors whether a predetermined period has elapsed. When the time elapsed is equal to or larger than the predetermined period, the flow returns to step S40, and the control unit 36 transmits the measurement start signal to the thermometer main body 10 to measure the body surface temperatures T1X and T3X and the reference temperatures T2X and T4X again.

In this way, the body surface temperatures T1X and T3X and the reference temperatures T2X and T4X are measured at predetermined time intervals. The body surface temperatures T1X and T3X and the reference temperatures T2X and T4X are corrected so as to calculate the core body temperature Tcore, and the core body temperature Tcore is stored in the storage unit 38.

First Modification

Next, an offset measurement state and a finished product state according to this modification will be described. The same elements as those of the embodiment described above will be denoted by the same reference numerals, and description thereof will be appropriately omitted.

Figure 6A:
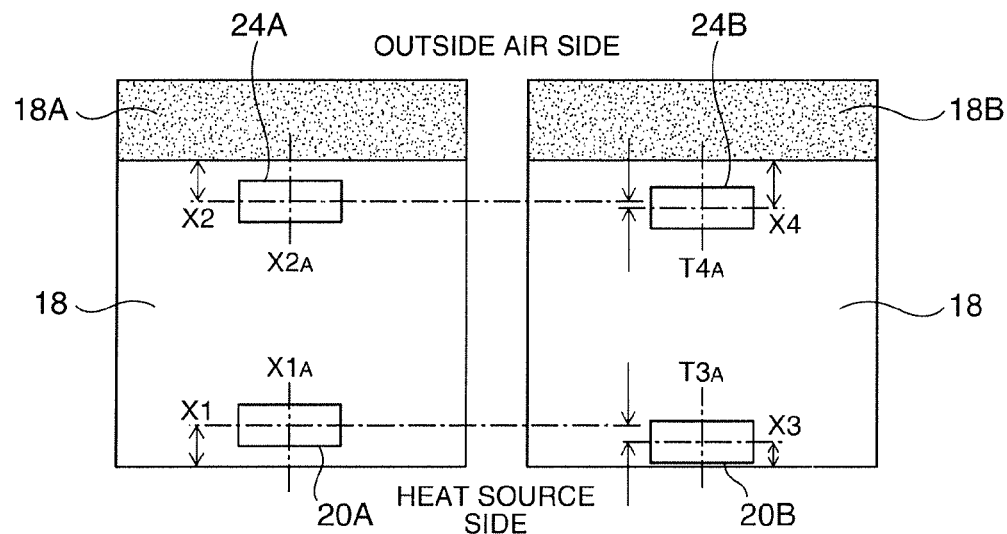
FIGS. 6A and 6B show a thermometer main body according to a first modification.
Figure 6B:
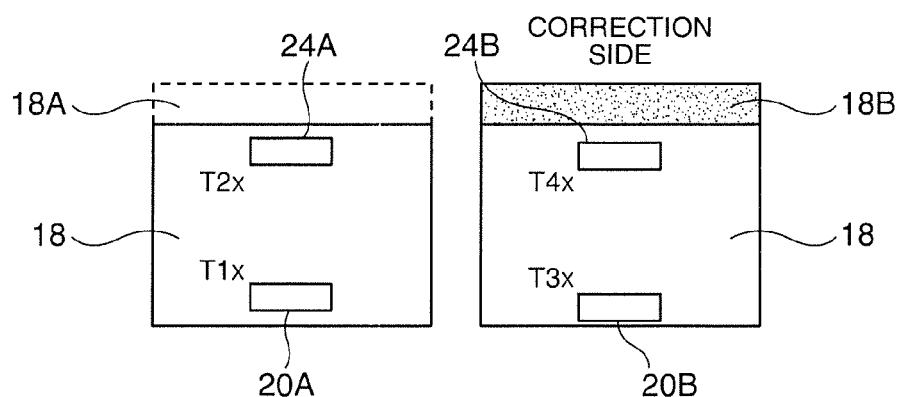

FIGS. 6A and 6B show a thermometer main body according to this modification. FIG. 6A shows an offset measurement state, and FIG. 6B shows a finished product state. In the offset measurement state, as shown in FIG. 6A, the first and second heat radiation control portions 18A and 18B are formed of a material having the same thermal resistance so that the first and second heat radiation control portions 18A and 18B have the same thermal resistance. In the finished product state, as shown in FIG. 6B, the first heat radiation control portion 18A is removed so that the first heat radiation control portion 18A of the temperature measuring unit 14A is different from that of the offset measurement state. From the finished product state, relational expressions of equations (16) and (17) representing the corrected second body surface temperature T3' and second reference temperature T4' on the same structure side as the offset measurement state are obtained.

[Formula 15]

$$\Delta Ta_A = T3_A - T1_A \\ \Delta Ta_X = \frac{T3_X - T4_X}{T3_A - T4_A} \Delta Ta_A \\ T3'_X = T3_X - \Delta Ta_X$$ (16)

$$\Delta Tb_A = T4_A - T2_A \\ \Delta Tb_X = \frac{T3_X - T4_X}{T3_A - T4_A} \Delta Tb_A \\ T4'_X = T4_X - \Delta Tb_X$$ (17)

Second Modification

Next, an offset measurement state and a finished product state according to this modification will be described. The same elements as those of the embodiment described above will be denoted by the same reference numerals, and description thereof will be appropriately omitted.

Figure 7A:
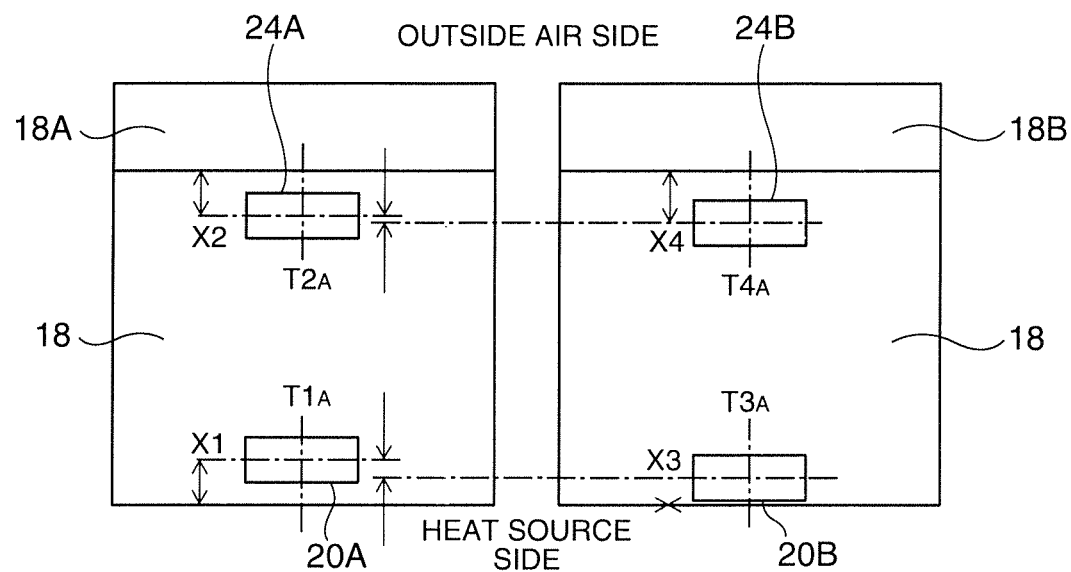
FIGS. 7A and 7B show a thermometer main body according to a second modification.
Figure 7B:
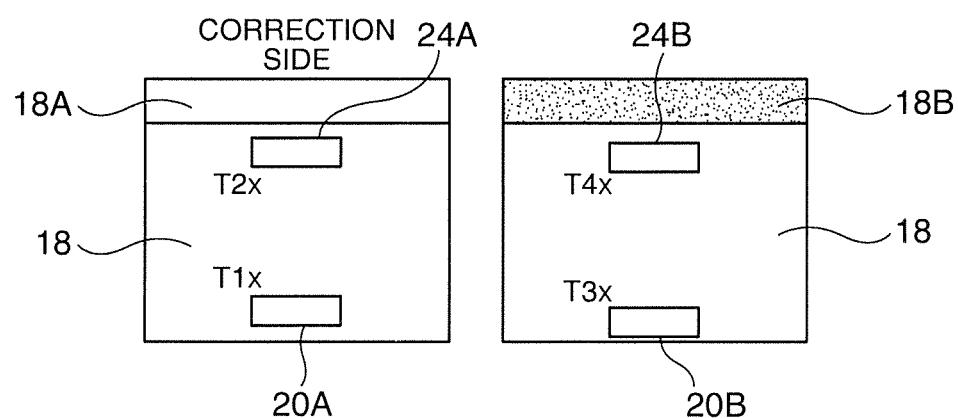

FIGS. 7A and 7B show a thermometer main body according to this modification. FIG. 7A shows an offset measurement state, and FIG. 7B shows a finished product state. In the offset measurement state, as shown in FIG. 7A, the first and second heat radiation control portions 18A and 18B are formed of a material having the same thermal resistance so that the first and second heat radiation control portions 18A and 18B have the same thermal resistance. In the finished product state, as shown in FIG. 7B, the second heat radiation control portion 18B is formed of a material having a different thermal resistance from that of the first heat radiation control portion 18A so that the second heat radiation control portion 18B of the temperature measuring unit 14B is different from that of the offset measurement state. From the finished product state, relational expressions of equations (4) and (5) representing the corrected first body surface temperature T1X' and first reference temperature T2X' on the same structure side as the offset measurement state are obtained.

Third Modification

Next, an offset measurement state and a finished product state according to this modification will be described. The same elements as those of the embodiment described above will be denoted by the same reference numerals, and description thereof will be appropriately omitted.

Figure 8A:
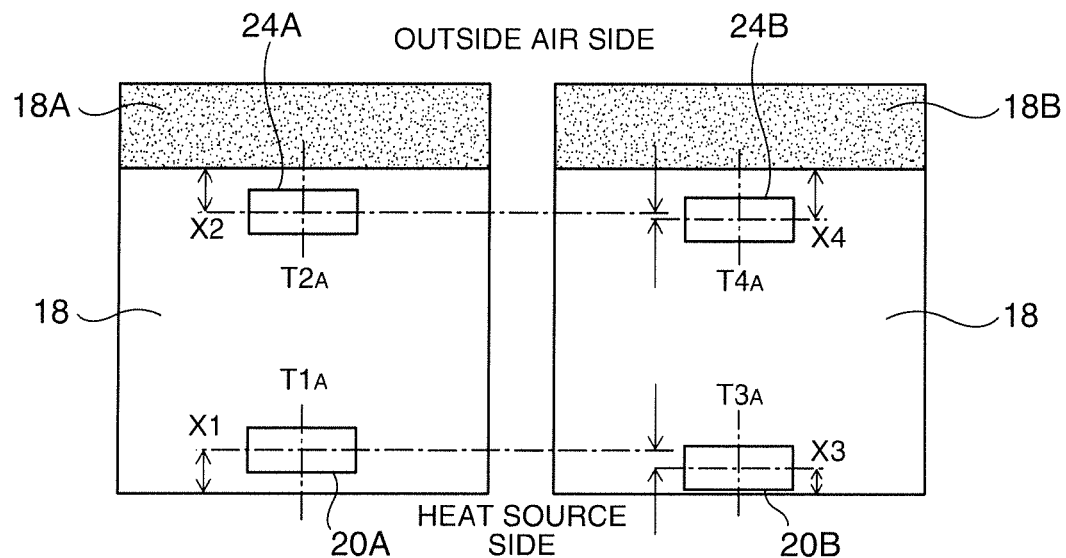
FIGS. 8A and 8B show a thermometer main body according to a third modification.
Figure 8B:
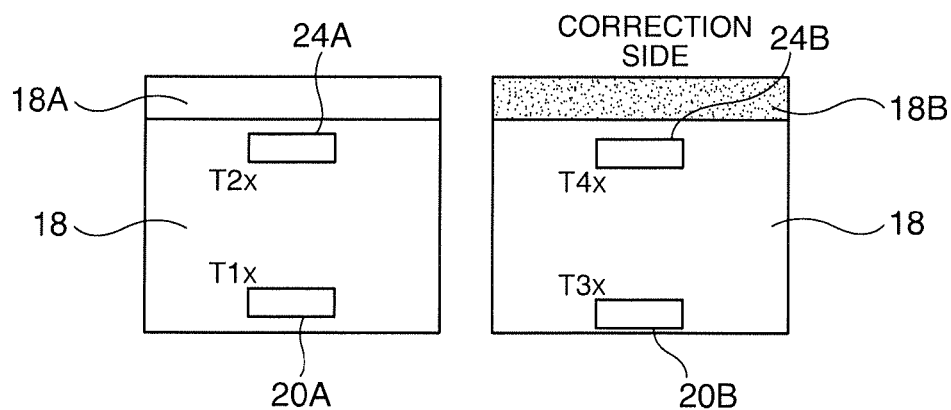

FIGS. 8A and 8B show a thermometer main body according to this modification. FIG. 8A shows an offset measurement state, and FIG. 8B shows a finished product state. In the offset measurement state, as shown in FIG. 8A, the first and second heat radiation control portions 18A and 18B are formed of a material having the same thermal resistance so that the first and second heat radiation control portions 18A and 18B have the same thermal resistance. In the finished product state, as shown in FIG. 8B, the first heat radiation control portion 18A is formed of a material having a different thermal resistance from that of the second heat radiation control portion 18B so that the first heat radiation control portion 18A of the temperature measuring unit 14A is different from that of the offset measurement state. From the finished product state, relational expressions of equations (16) and (17) representing the corrected second body surface temperature T3' and second reference temperature T4' on the same structure side as the offset measurement state are obtained.

First Embodiment

Next, actual measurement-based correction according to this modification will be described. The same elements as those of the embodiment described above will be denoted by the same reference numerals, and description thereof will be appropriately omitted.

Figure 9A:
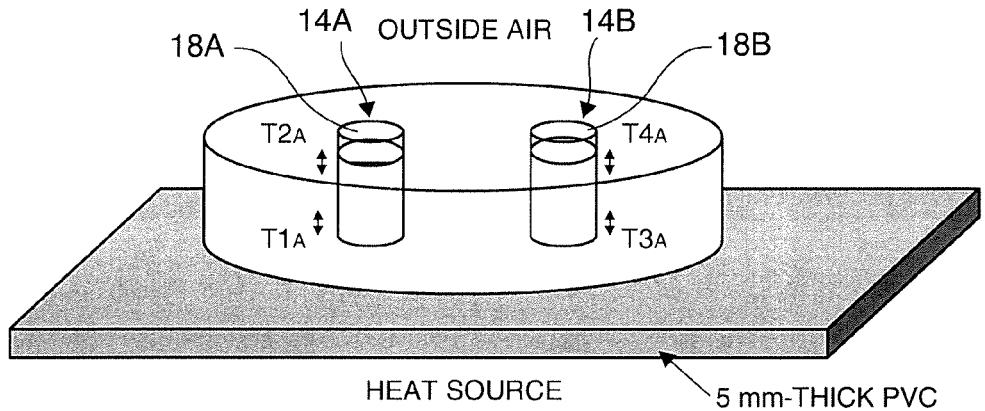
FIGS. 9A and 9B show a thermometer main body according to a first embodiment.
Figure 9B:
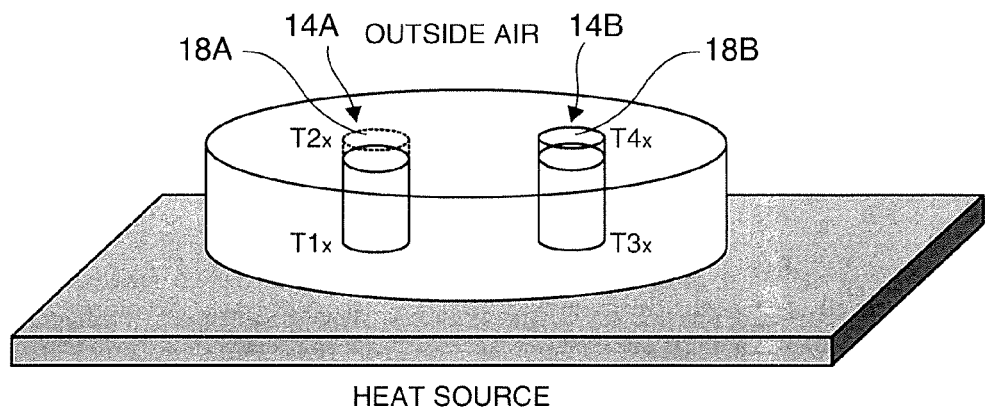

FIGS. 9A and 9B show a thermometer main body according to this embodiment. FIG. 9A shows an offset measurement state, and FIG. 9B shows a finished product state. FIG. 10 shows the results of actual measurement-based correction according to this embodiment. In the offset measurement state, as shown in FIG. 9A, the first and second heat radiation control portions 18A and 18B are formed of a material having the same thermal resistance so that the first and second heat radiation control portions 18A and 18B have the same thermal resistance. In the finished product state, as shown in FIG. 9B, the first heat radiation control portion 18A is removed so that the first heat radiation control portion 18A of the temperature measuring unit 14A is different from that of the offset measurement state.

According to the results of the actual measurement-based correction, as shown in FIG. 10, when the actual measurement temperature of a heat source was 37° C., the core body temperature Tcore was 36.4479° C. in an ideal state with no mounting position offset. The difference from the actual measurement was −0.5521° C.

The core body temperature Tcore was 35.45285° C. with a mounting position offset, and the difference from the actual measurement was −1.54715° C.

When actual measurement-based correction was performed in the offset measurement state which was achieved so as to have the same values as the heat source to be corrected, the core body temperature Tcore was 36.44466° C., and the difference from the actual measurement was −0.55534° C.

Subsequently, when calculation-based correction which involves offset measurement at a certain heat source temperature and temperature compensation was performed, the core body temperature Tcore was 36.44649° C., and the difference from the actual measurement was −0.55351° C. Moreover, the correction values were calculated from the offset measurement state at 40° C. This shows that the temperatures are corrected to approximately the "ideal" state in the case of "calculation-based correction".

Second Embodiment

Next, actual measurement-based correction according to this modification will be described. The same elements as those of the embodiment described above will be denoted by the same reference numerals, and description thereof will be appropriately omitted. Moreover, the offset measurement state and the finished product state are the same as those of the first embodiment.

FIG. 11 shows the results of actual measurement-based correction according to a second embodiment. According to the results of the actual measurement-based correction, as shown in FIG. 11, when the actual measurement temperature of a heat source was 43° C., the core body temperature Tcore was 42.17645° C. in an ideal state with no mounting position offset. The difference from the actual measurement was −0.8236° C.

The core body temperature Tcore was 40.62939° C. with a mounting position offset, and the difference from the actual measurement was −2.3706° C.

When actual measurement-based correction was performed in the offset measurement state which was achieved so as to have the same values as the heat source to be corrected, the core body temperature Tcore was 42.17111° C., and the difference from the actual measurement was −0.8289° C.

Subsequently, when calculation-based correction which involves offset measurement at a certain heat source temperature and temperature compensation was performed, the core body temperature Tcore was 42.17421° C., and the difference from the actual measurement was −0.8258° C. Moreover, the correction values were calculated from the offset measurement state at 40° C. This shows that the temperatures are corrected to approximately the "ideal" state in the case of "calculation-based correction". In this case, a temperature difference of 6° C. on the measurement subject results in a corrected temperature difference of 0.6° C. Therefore, it is necessary to perform an offset measurement over a wide temperature range or over the entire specified range if a high accuracy is needed. However, with the use of this temperature compensation method, it is possible to correct temperatures in the entire specified range through an offset measurement at a certain temperature at one location.

Subsequently, when an offset measurement was performed using a heat source having a temperature of 37° C. to obtain correction values and the correction values obtained at 37° C. were applied to a different heat source temperature, the core body temperature Tcore was 41.50777° C., and the difference from the actual measurement was −1.4922° C. This shows that the temperatures are not corrected to the "ideal" state in the case of "using correction values obtained at 37° C.".

Figure 12:
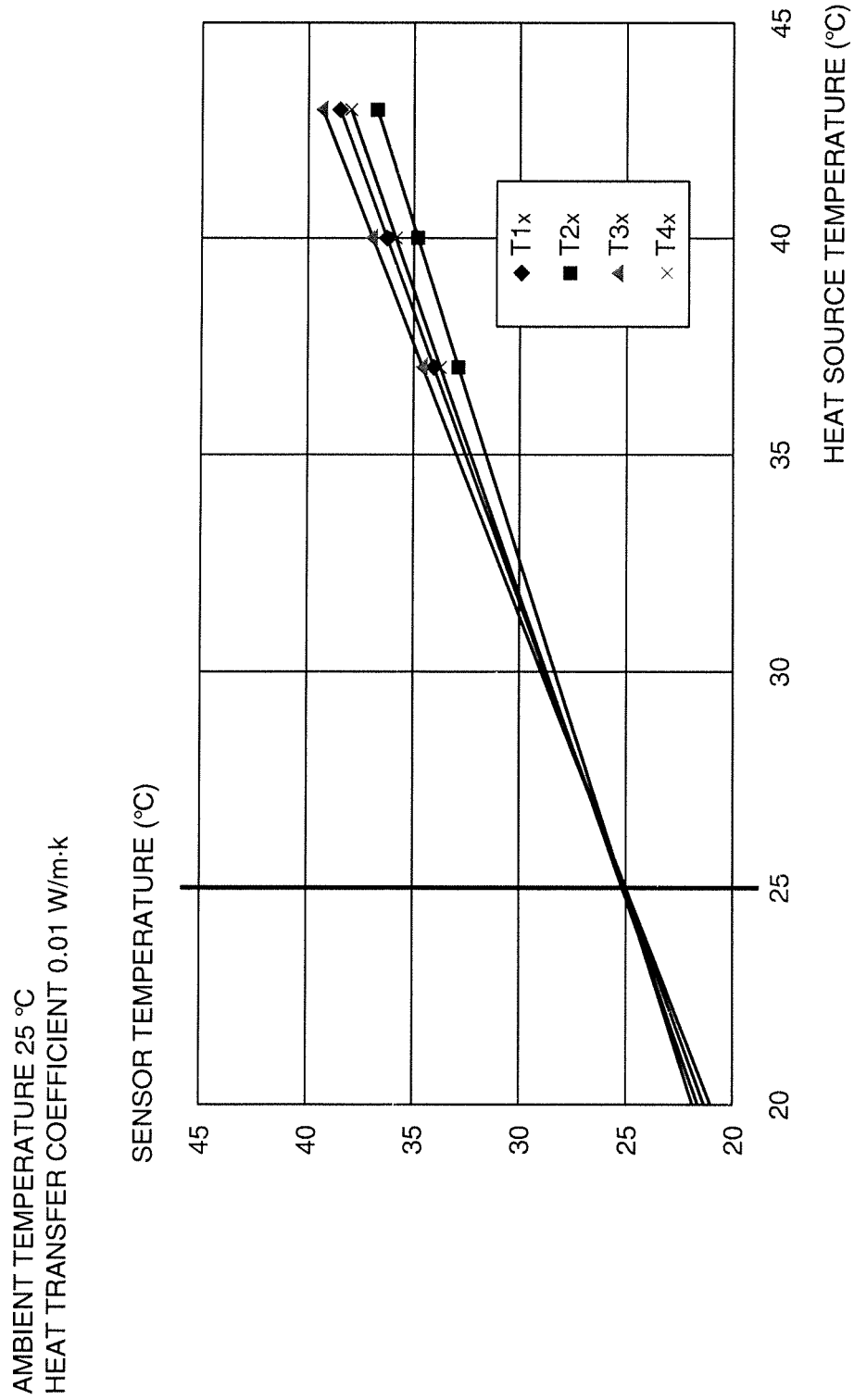
FIG. 12 is a graph showing temperature changes in respective sensors according to this embodiment.

FIG. 12 is a graph showing temperature changes in respective sensors according to this embodiment. The temperatures are measured under the conditions where the ambient temperature is 25° C. and the heat transfer coefficient between the temperature measuring unit and the outside air is 0.01 W/m·K. The horizontal axis represents the heat source temperature (° C.) and the vertical axis represents the sensor temperature (° C.). The respective sensors have different temperature gradients, and all lines meet at 25° C. where the heat source temperature is identical to the outside air temperature.

According to this embodiment, in a thermometer that measures the internal temperature via a substance, it is possible to calculate and correct the mounting position offsets of sensors and measure the core temperature with satisfactory accuracy. Moreover, it is possible to measure a wide range of temperatures to increase the accuracy by taking the temperature compensation into consideration in the calculation-based correction. Furthermore, since all temperatures can be corrected through calculation, there is no limit to the range of provided temperatures due to a mounting offset. In addition, it is not necessary to change the mounting settings of temperature sensors in accordance with the specified range. In this way, since the mounting position offsets of the sensors are corrected through calculation, the measurement accuracy of the internal temperature increases. Moreover, it is possible to decrease fault rates due to mounting offset of sensors and to improve yield.

Although the embodiments have been directed to a technical field of a biological device (particularly, an electronic thermometer), the invention can be applied to a device for detecting an internal temperature via a substance which is not limited to living bodies and to an industrial use for measuring the internal temperature of a furnace, a pipeline, or an engine room.

The entire disclosure of Japanese Patent Application No. 2010-052827, filed Mar. 10, 2010 is expressly incorporated by reference herein.

What is claimed is:

1. A thermometer comprising:
   a first surface temperature measurement unit that measures a first surface temperature (T1X) of a measurement subject;
   a first reference temperature measurement unit that measures a temperature as a first reference temperature (T2X) at a position where the temperature has a predetermined thermal resistance value between the position and the measurement position of the first surface temperature and has a first thermal resistance value between the position and the outside air;
   a second surface temperature measurement unit that measures a second surface temperature (T3X) at a surface position different from the measurement position of the first surface temperature;
   a second reference temperature measurement unit that measures a temperature as a second reference temperature (T4X) at a position where the temperature has the predetermined thermal resistance value between the position and the measurement position of the second surface temperature and has a second thermal resistance value different from the first thermal resistance value between the position and the outside air;
   a temperature correction unit that calculates amounting positional difference between the first and second surface temperature measurement units from the measurement subject and a mounting positional difference between the first and second reference temperature measurement units from the measurement subject in terms of temperature differences that compensate for temperature dependence, thus correcting the first surface temperature and first reference temperature, or the second surface temperature and second reference temperature; and
   a core temperature calculation unit that calculates a core temperature of the measurement subject using the first surface temperature and first reference temperature or the second surface temperature and second reference temperature corrected by the temperature correction unit.

2. The thermometer according to claim 1,
   wherein the temperature correction unit performs temperature compensation by an amount (ΔTaX, ΔTbX) given by the following equation (1) or (2) from a temperature difference (ΔTaA) between the temperature (T1A) of the first surface temperature measurement unit and the temperature (T3A) of the second surface temperature measurement unit in an offset state where the first and second thermal resistance values are the same and from a temperature difference (ΔTbA) between the temperature (T2A) of the first reference temperature measurement unit and the temperature (T4A) of the second reference temperature measurement unit, thus adding or subtracting the first surface temperature and the first reference temperature or the second surface temperature and the second reference temperature on the same side as a side where the first or second thermal resistance value is the same as the thermal resistance value in the offset state

[Formula 1]

$$\Delta Ta_X = \frac{T1_X - T2_X}{T1_A - T2_A} \Delta Ta_A \\ \Delta Tb_X = \frac{T1_X - T2_X}{T1_A - T2_A} \Delta Tb_A \Biggr\} \quad (1)$$

$$\Delta Ta_X = \frac{T3_X - T4_X}{T3_A - T4_A} \Delta Ta_A \\ \Delta Tb_X = \frac{T3_X - T4_X}{T3_A - T4_A} \Delta Tb_A \Biggr\} \quad (2)$$

3. The thermometer according to claim 1,
   wherein a common heat insulating portion having the predetermined thermal resistance value is provided between the measurement position of the first surface temperature and the measurement position of the first reference temperature and between the measurement position of the second surface temperature and the measurement position of the second reference temperature,
   wherein a first heat radiation control portion having the first thermal resistance value is provided between the measurement position of the first reference temperature and the outside air, and wherein a second heat radiation control portion having the second thermal resistance value is provided between the measurement position of the second reference temperature and the outside air.

4. The thermometer according to claim 1, further comprising:
- a display device having a display unit for displaying the core temperature calculated by the core temperature calculation unit; and
- a thermometer main body having the first and second surface temperature measurement units,
- wherein the display device and the thermometer main body are provided separately.

5. The thermometer according to claim 4,
wherein the core temperature calculation unit is provided in the display device.

6. The thermometer according to claim 4,
wherein the display device and the thermometer main body have a transceiver device capable of transmitting and receiving information to/from each other through wireless communication.

7. The thermometer according to claim 1,
wherein the thermometer is configured to be attachable to the surface of the measurement subject.

8. A temperature measurement method for measuring a core temperature of a measurement subject, comprising:
- measuring a first surface temperature of the measurement subject, thus measuring a temperature as a first reference temperature at a position where the temperature has a predetermined thermal resistance value between the position and the measurement position of the first surface temperature and has a first thermal resistance value between the position and the outside air;
- measuring a second surface temperature at a surface position different from the measurement position of the first surface temperature, thus measuring a temperature as a second reference temperature at a position where the temperature has the predetermined thermal resistance value between the position and the measurement position of the second surface temperature and has a second thermal resistance value different from the first thermal resistance value between the position and the outside air;
- calculating a measurement positional difference between the first and second surface temperatures from the measurement subject and a measurement positional difference between the first and second reference temperatures from the measurement subject in terms of temperature differences that compensate for temperature dependence, thus correcting the first surface temperature and first reference temperature, or the second surface temperature and second reference temperature; and
- calculating the core temperature based on the corrected first surface temperature and first reference temperature or the corrected second surface temperature and second reference temperature.

* * * * *